United States Patent [19]

Prokopius

[11] 3,898,882

[45] Aug. 12, 1975

[54] FLOW MEASURING APPARATUS

[75] Inventor: Paul R. Prokopius, Brecksville, Ohio

[73] Assignee: The United States of America as represented by the United States National Aeronautics and Space Administration, Washington, D.C.

[22] Filed: Feb. 28, 1974

[21] Appl. No.: 447,124

[52] U.S. Cl. .............................. 73/194 M; 73/195
[51] Int. Cl.$^2$ ........................................... G01F 1/88
[58] Field of Search ........ 73/61.1, 194 M, 204, 195; 235/151.34

[56] References Cited
UNITED STATES PATENTS

| | | | |
|---|---|---|---|
| 3,273,377 | 9/1966 | Testerman et al. .................. | 73/23.1 |
| 3,304,766 | 2/1967 | Hubby ................................ | 73/61.1 |
| 3,621,716 | 11/1971 | Rosso .................................. | 73/194 |
| 3,726,126 | 4/1973 | DeVittorio ........................... | 73/190 |

Primary Examiner—Herbert Goldstein
Attorney, Agent, or Firm—N. T. Musial; J. A. Mackin; J. R. Manning

[57] ABSTRACT

Apparatus for measuring the mass flow rates of the components comprising a binary gas mixture is provided. This is accomplished by directing a binary fluid or gas through a fluidic humidity sensor and then through a calorimeter which increases the temperature of the flowing binary gas. Electrical signals provided by the fluidic humidity sensor, the flow calorimeter and a power supply which energizes or heats the calorimeter are operated upon in a predetermined manner to provide an output signal indicative of the mass flow rate of one of the binary gases, thus allowing the mass flow rate of the other gas to be determined since the total mass flow rate is previously calculated by the instrument and is the output of operating module 19.

10 Claims, 3 Drawing Figures

FLOW MEASURING APPARATUS

ORIGIN OF THE INVENTION

The invention described herein was made by an employee of the U.S. Government and may be manufactured and used by or for the Government of the United States of America without the payment of any royalties thereon or therefor.

BACKGROUND OF THE INVENTION

This invention relates to measuring instruments and is directed more particularly to instrumentation for providing a direct, absolute reading of the mass flow rates of the components comprising a binary gas mixture. A particular application wherein the advantages of the instant invention are advantageous is the study of hydrogen-oxygen fuel cell systems. In one such study, controlled disturbances are introduced into the humid-hydrogen gas stream which enters a fuel cell. The effects of such action on the operating parameters of the fuel cell are then investigated. In order to study the effects on the fuel-cell water removal processes, it is necessary to know, on a continuous basis, the mass flow rates of the individual components comprising the binary gas mixture (humid-hydrogen).

In previous fuel cell studies, the humidity (steam-to-hydrogen mass ratio) of the hydrogen stream leaving a fuel cell has been determined by utilizing a fluidic oscillator which generated fluidic pulsations of frequency dependent on the molecular weight of the fluid stream. These pulsations were then utilized to provide a unidirectional voltage which was the analog of the mass ratio of the gas components. Although this information was very important in fuel cell studies, it provided only a portion of the information needed to determine the mass flow rate of the component gases.

Although numerous prior art devices are known for measuring flow rates and constituent percentages, no prior art instrument is known for indicating the mass flow rate of the constituent gases of a binary gas mixture. In general, the prior art provides instrumentation for measuring; the percent content of a contaminant gas in a binary mixture; the total flow rate of a gas mixture; the constituent percentage of a two-phase liquid mixture and the flow rate of a gaseous stream whose mixture remains constant but whose total flow rate varies.

OBJECTS AND SUMMARY OF THE INVENTION

It is an object of the invention to provide a new and novel apparatus for measuring the mass flow rates of the constituents of a binary gas.

It is another object of the invention to provide apparatus of the foregoing type which measures the mass flow rates of the constituent gases of a binary gas mixture despite variations in the percentages by weight of each gas in the binary mixture.

It is a further object of the invention to provide apparatus of the foregoing type wherein accuracy of the measurement is virtually unaffected by sudden changes in the mass ratio of the flowing binary gas.

Yet another object of the invention is to provide apparatus of the foregoing type wherein changes and binary gas pressure will not affect the mass flow rate measurement obtained.

In summary, the invention provides apparatus for generating analog signals of the constituent mass ratio of the binary gas, the temperature rise produced by heating the flowing gas, the energy required to heat the gas, and circuitry for operating on these signals to produce a measurement of the mass flow rate of the constituent gases.

DESCRIPTION OF A PREFERRED EMBODIMENT

Figure 1:
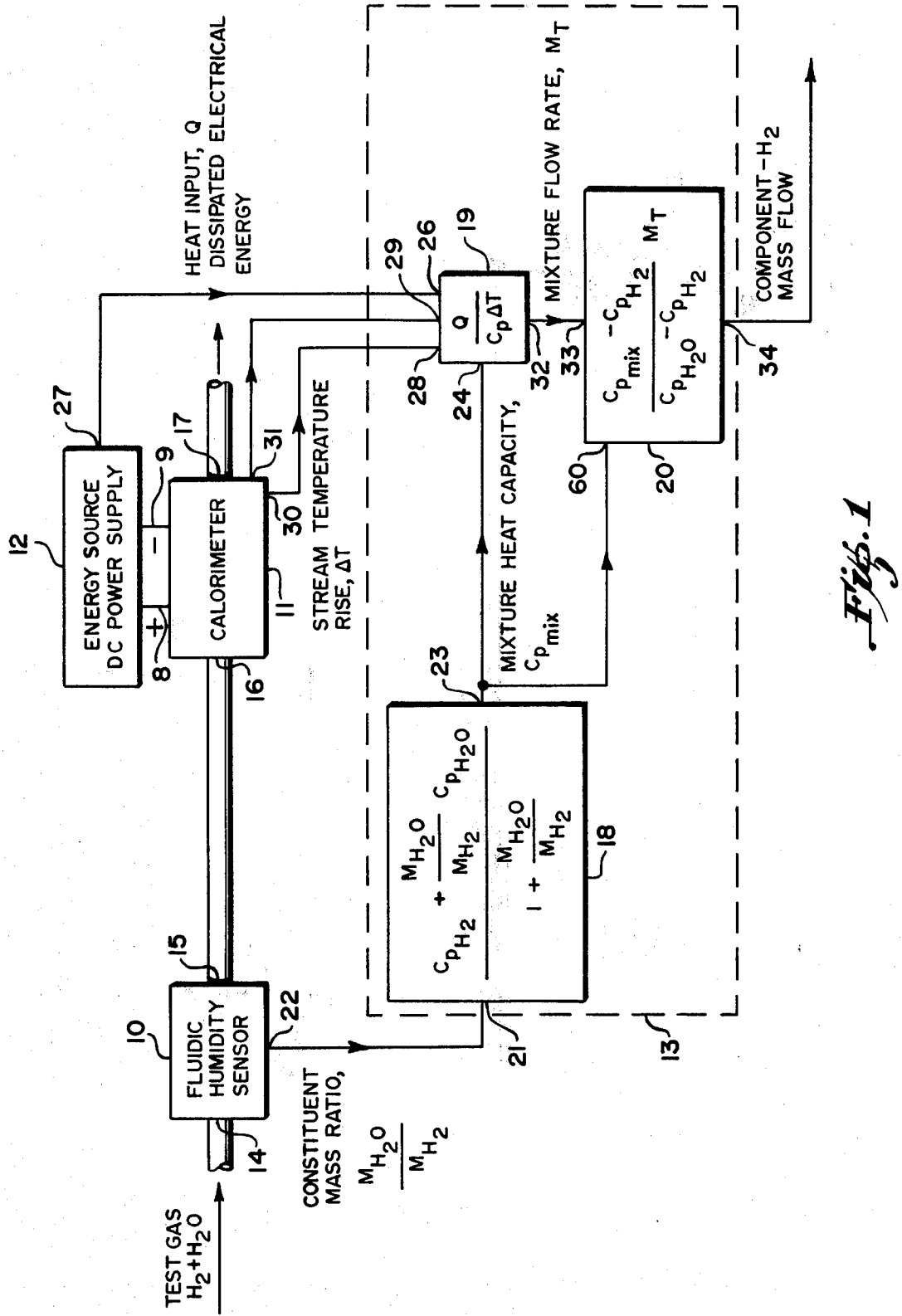
FIG. 1 is a general schematic and block diagram of apparatus embodying the invention.

Referring now to FIG. 1, there is shown a schematic block diagram of apparatus embodying the invention and comprising a fluidic humidity sensor 10, a calorimeter 11, an energy source such as DC power supply 12 and a computer 13, as indicated by the dashed line. A binary test gas flows into gas inlet 14 and out of gas outlet 15 of the humidity sensor 10 from which it is directed through calorimeter 11 entering at gas inlet 16 and exiting at gas exit 17. Calorimeter 11 is energized by electrical power from DC power supply 12 via leads 18 and 19.

To the end that electrical signals generated by the humidity sensor 10, calorimeter 11 and the power supply 12 will be operated upon in a prescribed manner, as will be explained presently, computer 13 includes operating modules 18, 19 and 20, each of which performs the mathematical operation indicated thereon. Operating module 18 has a signal input terminal 21 connected to a signal output terminal 22 on the fluidic humidity sensor 10 and a signal output terminal 23 connected to a signal input terminal 24 on operating module 19. Operating module 19 also has an input terminal 26 for receiving from an output terminal 27 of the DC power supply 12 a signal indicative of the watt energy (heat input, Q) supplied by the power supply 12 to the flow calorimeter 11. Additionally, the operating module 19 has a pair of input terminals 28 and 29 connected to signal output terminals 30 and 31, respectively, of the flow calorimeter 11. The signal supplied to input terminal 28 is the measurement of the temperature of the binary gas as it enters the flow calorimeter 11 while the signal supplied to input terminal 29 is a temperature measurement of the binary gas as it leaves the calorimeter. An output signal of operating module 19 is directed from an output terminal 32 to an input terminal 33 of operating module 20.

The measurement which is the object of the invention, that is the mass flow rate of one of the constituent gases of the binary gas mixture, appears at output terminal 34 of the operating module 20.

In summation, the binary test gas is directed through the humidity sensor 10 and then through a flow calorimeter which increases the temperature of the gas. A signal which is the analog of the mass ratio of the constituents of the binary gas is directed from output terminal 22 of sensor 10 to input terminal 21 of operating module 18. The output at terminal 23 of module 18 is a signal indicative of the heat capacity ($C_{p_{mix}}$) of the binary gas mixture and is applied to input terminal 24 of operating module 19. The output at terminal 23 is likewise transmitted to an input terminal 60 of operating module 20 to provide the factor $C_{\mu_{mix}}$ required by the operation of module 20.

A signal indicative of the energy (Q) supplied by power supply 12 to the calorimeter to increase the temperature of the binary gas is applied to input terminal 26 of module 19.

Because, as indicated previously, the signal applied to input terminal 28 of module 19 is a measurement of the temperature of the binary gas flowing into flow calorimeter 11 while the signal applied to input terminal 29 is a measurement of the temperature of the binary gas as it leaves the calorimeter, the voltage difference between the terminals is the $\Delta T$ factor of the operation to be performed by module 19.

As a result of the operation performed by module 19, the signal directed from output terminal 32 thereof to input terminal 33 of module 20 represents the total flow rate of the binary gas mixture. After the operation shown on module 20 is performed, the output of module 20 and output terminal 34 represents the mass flow rate of one component of the binary gas mixture.

Figure 2:
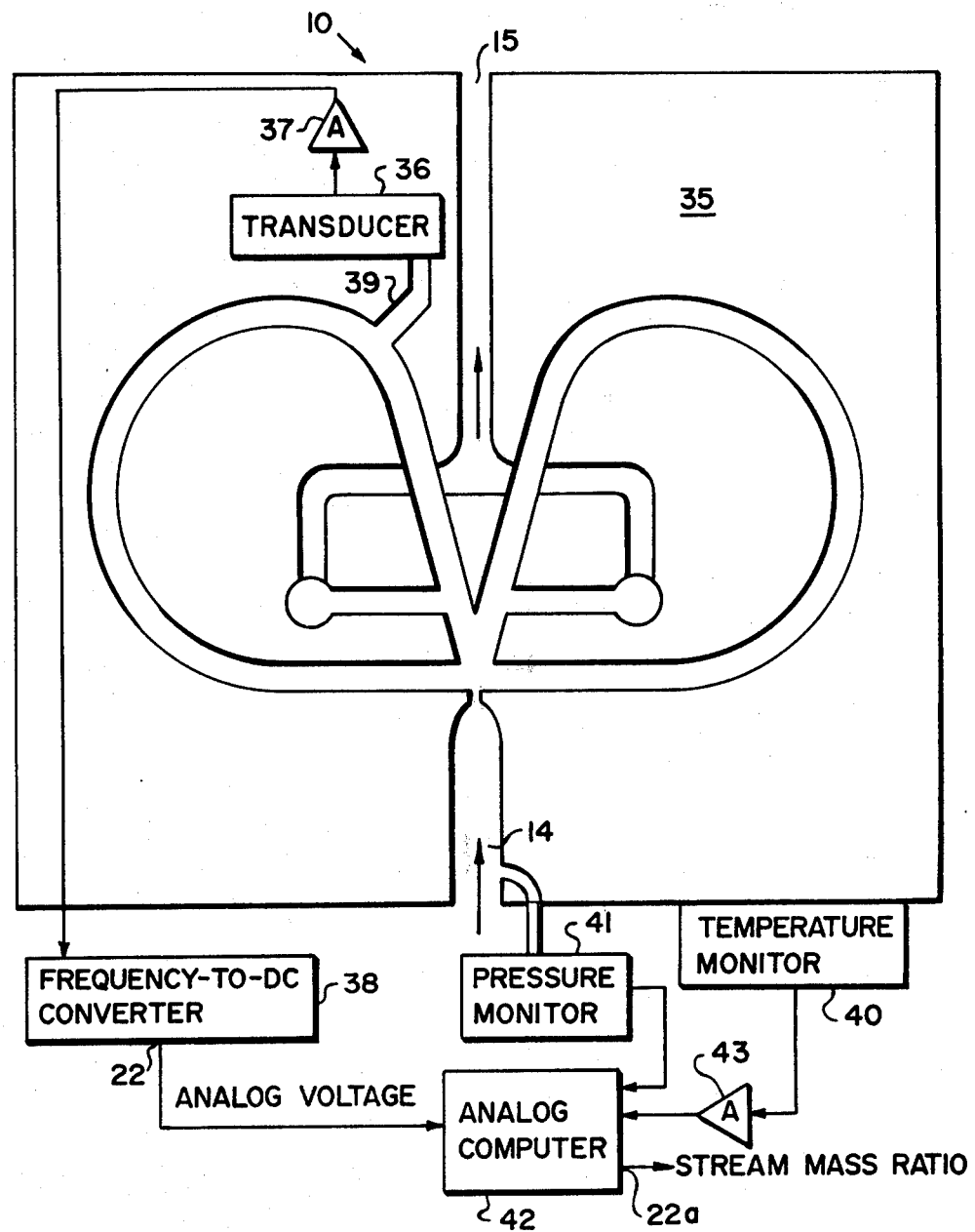
FIG. 2 is a plan view of a fluidic oscillator and block diagram of related circuitry which comprise one portion of the invention.

Referring now to FIG. 2, there is shown a combination plan view of a fluidic oscillator and a schematic block diagram of the electronic circuitry which together comprised the fluidic humidity sensor 10 shown in FIG. 1. The fluidic humidity sensor 10 comprises a fluidic oscillator 35, a transducer 36, an amplifier 37 and a frequency-to-DC converter 38. Such converters are well-known in the electrical art.

The fluidic oscillator 35 is a commercially available type which generates fluid pressure pulsations when a fluid such as a gas is directed into inlet port 14 and exhausted from outlet port 15. The frequency of the pulsations developed is dependent upon the mass of fluid flowing through the oscillator. Consequently, the frequency of pulsation of the oscillator is indicative of the mass of the flowing fluid and in the case of a binary fluid is directly related to the mass ratio of the flowing gas.

The fluid pulsations of oscillator 35 are directed through a conduit 39 to a transducer 36 of the type which converts pressure pulsations into electrical pulses. In order to increase the magnitude of the electrical pulses an amplifier 37 may be interposted between transducer 36 and frequency-to-DC converter 38 which receives the electrical pulses.

The frequency-to-DC converter 38 coverts the period voltage pulses to a direct-current voltage which increases or decreases if the frequency of pulsation of the oscillator 35 increases or decreases. Thus, it will be seen that the direct-current voltage is an analog of the oscillator frequency and, accordingly, is an analog of the mass ratio of the binary gas flowing through the oscillator. This analog voltage appears at output 22 of the frequency-to-DC converter which corresponds to the output terminal 22 of the fluidic sensor in FIG. 1.

The oscillator 35 normally has a pulsation rate which is accurately related to the mass of the fluid flowing therethrough. However, unless both the pressure and temperature of the fluid being delivered to the oscillator are constant, some deviation of the pulsation frequency from normal will be experienced leading to inaccurate measurements of the mass flow rate. This can be overcome by maintaining the temperature and pressure constant. This would require a great deal of monitoring and adjusting and may, in some cases, be impractical. The temperature of oscillator 35 can, however, be stabilized by enclosing it in an oven.

Accordingly, to maintain accuracy of measurement despite changes in temperature and pressure of the flowing binary fluid or gas, a temperature monitor 40, a pressure monitor 41 and an analog computer 42 are provided. A temperature measurement of the fluidic oscillator 35 may be directed from monitor 40 through an amplifier 43 to the analog computer 42 and, likewise, a pressure measurement of the flowing gas may be directed to the computer 42 from the pressure monitor 41. These signals provide correction factors which are applied to the analog voltage from the frequency-to-DC converter 38 so that a corrected analog of the fluid stream mass ratio appears at output 22a of the computer. The output 22a is identical to the output 22 of sensor 10 shown in FIG. 1, that is, it is an analog of the binary fluid stream mass ration but corrected for temperature and pressure variations.

It will be understood by those skilled in the art that calibration curves to determine the change in pulsation frequency of the oscillator with temperature and pressure must be plotted to determine the correction factors which must be incorporated in the computer 42.

Figure 3:
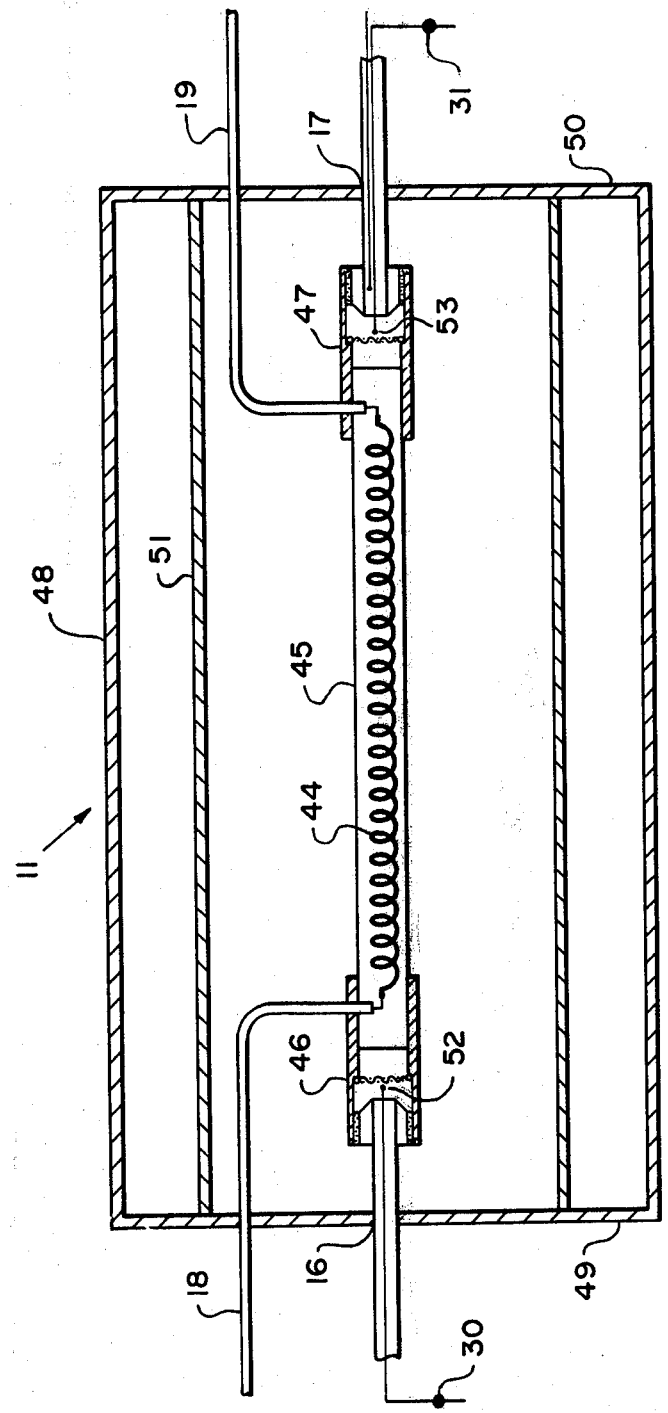
FIG. 3 is a longitudinal section of the calorimeter shown in FIG. 1.

FIG. 3 is a longitudinal section of the calorimeter shown as block 11 in FIG. 1. Parts in FIG. 3 corresponding to those in FIG. 1 are identified by like numerals. The calorimeter 11 includes a heating element 44 connected to electrical energizing leads 18 and 19 and disposed in a tube 45. The tube 45 communicates with gas input 16 and gas output 17 by means of respective connectors 46 and 47. Disposed around tube 45 is a cylindrical stainless steel housing 48 having end walls 49 and 50. An inner wall 51 of polished stainless steel is disposed radially inwardly of cylinder 48. The space between 48 and 51 is evacuated to provide a vacuum.

A thermocouple 52 is disposed in connector 46 and provides an electrical signal indicative of the temperature of the incoming gas to a calorimeter output terminal 30. Similarly, a thermocouple 53 disposed in connector 47 provides a temperature measurement of the outflowing gas to an output terminal 31. Accordingly, it will be seen that the factor $\Delta T$ is developed between the output terminals 30 and 31 and is then directed to the terminals 28 and 29 of the operating module 19 as discussed with regard to FIG. 1.

While the foregoing invention has been described with respect to a flowing binary gas consisting of hydrogen and water vapor, it is also useful for other binary gases.

It will be understood that persons skilled in the art to which the invention relates may make changes and modifications to the above-described invention without departing from the spirit and scope of the invention, as set forth in the claims appended hereto.

What is claimed is:

1. Apparatus for measuring the instantaneous mass flow rate of a binary gas stream comprising:
   means for generating a signal representative of the mass flow ratio of the binary gas;
   means for increasing the temperature of the binary gas;
   means for measuring the temperature increase of the binary gas caused by said second named means and generating a signal indicative thereof;
   means for generating a signal representative of the energy required by said second named means to produce the temperature increase measured by said third names means; and means for operating on the signals of said first, third and fourth named means to yield a signal indicative of the mass flow rate of one of the gases of said binary gas.

2. The apparatus of claim 1 wherein said fifth named means includes:

means for operating on the signal of said first named means to produce a signal representative of the specific heat of the binary gas;

means for dividing the signal of said fourth named means by the product of the signal of said sixth named means and said third named means to produce a signal representative of the binary gas flow rate; and means for operating on the signal of the last named means and on the signal of the sixth named means to produce a signal indicative of the mass flow rate of one of the gases of the binary gas.

3. The structure of claim 1 wherein said second named means comprises:

an elongated tube having an inlet and an outlet for the binary gas;

a temperature stabilizing chamber disposed outwardly of said tube;

a reflective wall disposed around the tube between it and the chamber, the space between the reflective wall and the chamber being a vacuum.

an electrically energized heating element disposed in said tube; and power supply means connected to said heating element to energize same.

4. The apparatus of claim 1 wherein said first named means comprises a fluidic oscillator having an input for receiving a binary gas and an output communicating with the second named means, said oscillator producing a fluid pressure oscillation whose frequency is dependent on the mass ratio of the binary gas;

means for converting the fluid pressure oscillation to an electrical oscillation; and means for converting the electrical oscillation to a direct-current voltage which varies in magnitude in accordance with the frequency of the electrical oscillation and thus in accordance to the mass ratio of the binary gas passing through the fluidic oscillator.

5. The apparatus of claim 4 and including computer means for changing the magnitude of said direct-current voltage in accordance with temperature variations of said fluidic oscillator, and means for measuring the temperature of said fluidic oscillator and for supplying a signal indicative thereof to said computer means.

6. The apparatus of claim 4 and including computer means for changing the magnitude of said direct-current voltage in accordance with the changes in pressure of the binary gas at the input of said fluidic oscillator, and means for measuring the pressure of the binary gas at the input of said fluidic oscillator and for supplying a signal indicative thereof to said computer means.

7. The apparatus of claim 1 wherein said binary gas is humid-hydrogen.

8. The apparatus of claim 1 wherein said humidity sensor is disposed in a constant temperature oven to stabilize the temperature of said humidity sensor.

9. The apparatus of claim 1 and including means for regulating the pressure of the gas supplied to the fluidic humidity sensor to a fixed predetermined value.

10. The apparatus of claim 1 wherein said means for measuring the increase of temperature of the binary gas comprises a first thermocouple disposed in the flowing binary gas before its temperature is increased and a second thermocouple disposed in the flowing binary gas after its temperature has been increased.

* * * * *